J. P. FIEBIG.
FLOATING FLY OR BAIT.
APPLICATION FILED MAY 18, 1916.

1,212,752.

Patented Jan. 16, 1917.

WITNESSES:
A. C. Maher.
M. F. Terry

INVENTOR
John P. Fiebig
BY
F. N. Gilbert
ATTORNEY

UNITED STATES PATENT OFFICE.

JOHN P. FIEBIG, OF CANDOR, NEW YORK.

FLOATING FLY OR BAIT.

1,212,752.          Specification of Letters Patent.      Patented Jan. 16, 1917.

Application filed May 18, 1916. Serial No. 98,304.

*To all whom it may concern:*

Be it known that I, JOHN P. FIEBIG, a citizen of the United States, residing at Candor, in the county of Tioga and State of New York, have invented certain new and useful Improvements in Floating Flies or Bait, of which the following is a specification.

My invention relates to an improvement in artificial bait used in angling, commonly known as an "artificial fly" but more particularly known as floating fly or bait in which the hook used to catch fish is dressed so as to resemble a fly or other like insect and forms what has been termed a fly hook or floating bait.

The particular object of my device is to allow extreme lightness at the same time present a surface of fly body or bait body impervious to water.

Heretofore in artificial flies or fly hooks, the fly body or bait body and its binding support or windings have been composed of silk or wool or other light material.

In my device the imitation body of the fly is composed of kapok instead of feathers, wool, mohair or silk.

With this object in view my invention consists in certain novel features of material and combination of material as will be hereinafter fully described and pointed out in the claims, reference being had to the accompanying drawings, in which—

Figure 3:
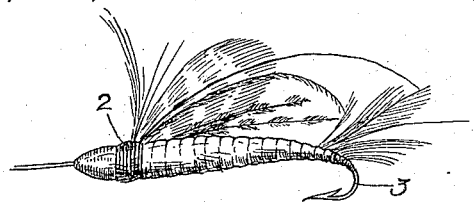
Figure 2:
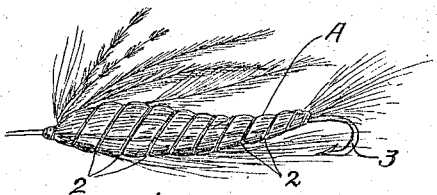
Figure 1:
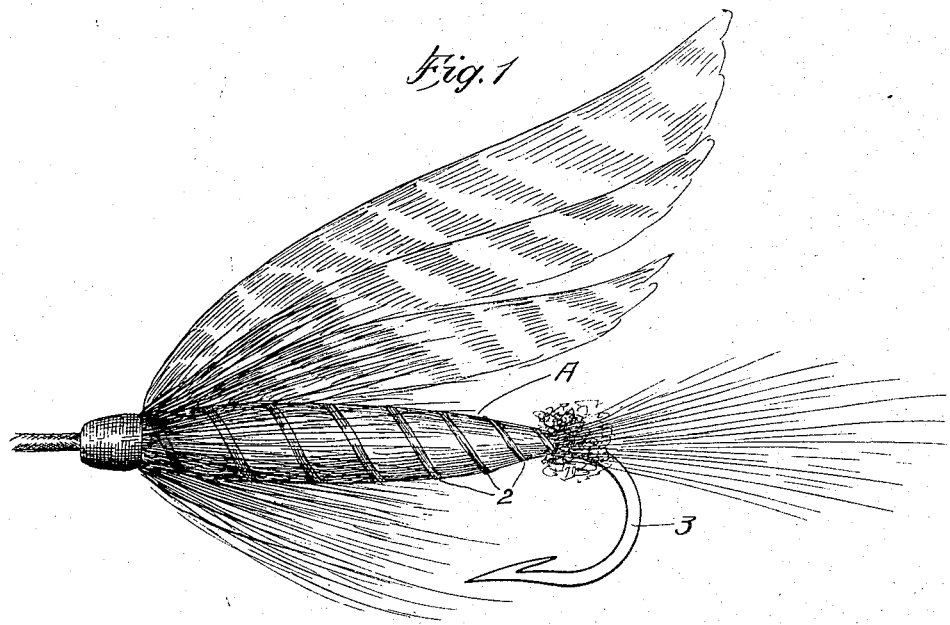
Figure 4:
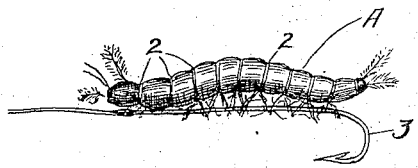

Figure 1 represents a perspective view of my device. Fig. 2 is a perspective view of a modified form of my device. Fig. 3 is a perspective view of a modified form of my device. Fig. 4 is a perspective view of an additional modified form of my device.

In carrying out my invention I provide a fly or bait body A composed of kapok and with windings or strands 2, 2, etc., holding to the hook 3, which strands are composed of a strand formed of kapok or part kapok and part silk. My device may have upon it wings of a fly and laterally projecting portions having the usual flexibility composed of any suitable material, but the body and windings or threads composed of kapok. Or I may form the body portion out of any suitable material but bound or fastened to the hook 3 by strands or threads composed entirely of kapok or part kapok and part silk. The material kapok can be used and the method employed to make innumerable artificial insects, bugs, or other body forms used for bait in surface fishing.

As shown in Fig. 2, I provide an insect body A composed of kapok and with the windings or strands 2, 2, 2, etc., holding it to the hook 3, which strands are composed of a strand formed of kapok or part kapok and part silk; or I may form the body portion A out of any suitable material, but bound or fastened to the hook 3 by strands or threads 2, 2, 2, etc., composed entirely of kapok or part kapok and part silk. Or also as shown in Fig. 3 I provide a different form of insect body A composed of kapok and with the windings or strands 2, 2, 2, etc., holding it to the hook 3 which strands are composed of a strand formed of kapok or part kapok and part silk or I may again form the body portion A out of any suitable material but bound or fastened to the hook 3 by strands or threads 2, 2, 2, etc., composed entirely of kapok or part kapok and part silk. Or further as shown in Fig. 4, I provide a still different form of insect body A composed of kapok and with the windings or strands 2, 2, 2, holding it to the hook 3 which strands are composed of a strand formed of kapok or part kapok and part silk or I may again form the body portion A out of any suitable material but bound or fastened to the hook 3 by strands or threads 2, 2, 2 composed entirely of kapok or part kapok and part silk.

Having thus described my invention what I claim as new and for which I desire Letters Patent is as follows:

1. In a floating fly or artificial bait—a fly body composed of kapok and bound to the hook with strands or threads of kapok and silk.

2. In a floating fly or artificial bait, a body portion composed entirely of kapok and bound with any suitable material.

3. In a floating fly or artificial bait, a fly or body portion composed of kapok.

4. In a floating fly or artificial bait, a fly or body portion composed of kapok and which body portion is bound to the hook by strands composed of the same substance.

In testimony whereof I have affixed my signature in the presence of two witnesses.

JOHN P. FIEBIG.

Witnesses:
A. C. MAHER,
M. F. TERRY.

Copies of this patent may be obtained for five cents each, by addressing the "Commissioner of Patents, Washington, D. C."